May 26, 1970 C. T. COOPER 3,514,135
INTERNAL EXPANDING COUPLING FOR TUBULAR MEMBERS
Filed Aug. 16, 1968
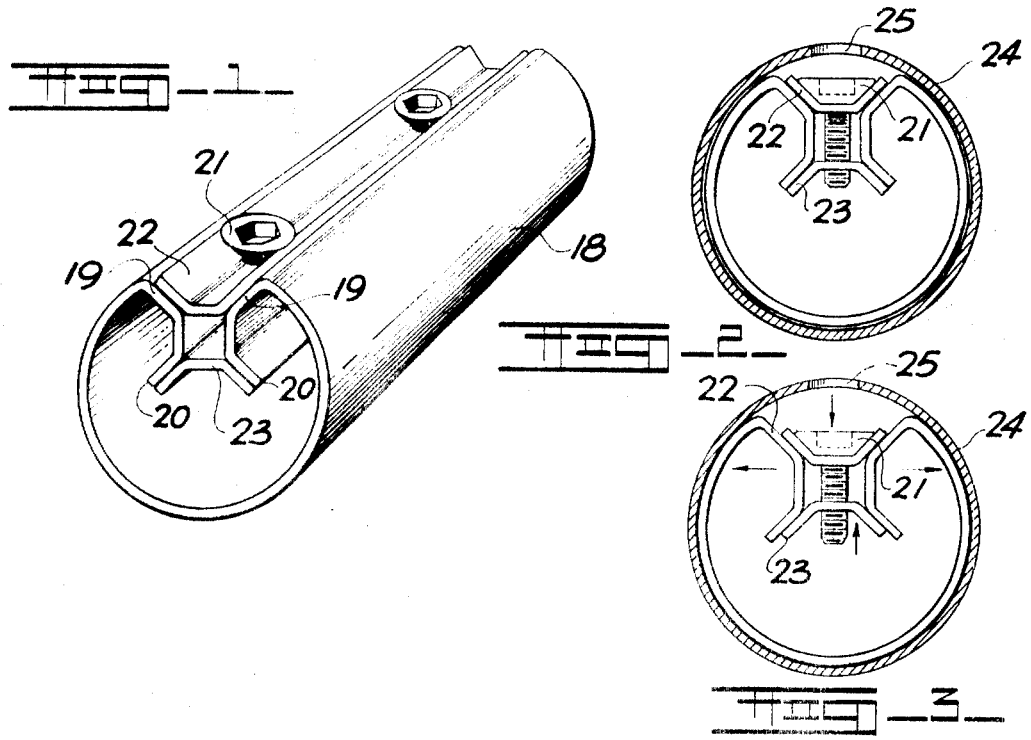
INVENTOR.
Clinton T. Cooper.
BY
W. B. Hangman
ATTORNEY.

United States Patent Office 3,514,135
Patented May 26, 1970

3,514,135
INTERNAL EXPANDING COUPLING FOR
TUBULAR MEMBERS
Clinton T. Cooper, 372 Melbourne Ave.,
Youngstown, Ohio 44512
Filed Aug. 16, 1968, Ser. No. 753,271
Int. Cl. F16b 7/00
U.S. Cl. 285—397                                    2 Claims

ABSTRACT OF THE DISCLOSURE

An internal expanding coupling for coaxially joining tubular members consisting of a split sleeve for registry in said tubular members and having oppositely disposed angularly inclined longitudinal flanges extending inwardly thereof together with means movable radially of said coupling between said flanges for moving the same apart and expanding said sleeve.

BACKGROUND OF THE INVENTION

Field of the invention

This invention relates to coupling devices for tubular members wherein said tubular members are coaxially joined in abutting relation.

Description of the prior art

Prior structures of this type including multiple part structures which are forced apart by screws or bolts to create an expanding action within the ends of tubular members to be joined such as, for example, in Pat. 2,850,304 and constructions wherein the inner surfaces of tubular members to be joined are grooved and a split ring having spaced annular ribs registerable with the grooves is expanded into the grooves to hold the tubular members together as in Pat. 3,122,383. Still another form of coupling device comprises an internal wedge in the form of a bar positioned inside of a split sleeve and movable toward the split area of the sleeve by means of screws or bolts threadably engaging the bar so as to expand the sleeve and thus secure it within the ends of the tubular members to be joined as in Pat. 2,997,317.

This invention eliminates the opposed expanding action of the members as in Pat. 2,850,304, eliminates the inherent looseness in the groove and ribbed fitting of Pat. 3,122,383 and provides a positive expanding action of large degree through the use of the in-turned angularly disposed flanges formed directly on the expanding sleeve of the device as compared with the application of expansion force through the edges of the wedge in Pat. 2,997,317 and the limited spreading action of the split sleeve as occasioned by the tapered head of the bolt of that disclosure.

SUMMARY OF THE INVENTION

An internal expanding coupling for tubular members adapted to join the same coaxially in abutting relation through the use of an expanding split sleeve capable of relatively great expansion by reason of the formation of the split sleeve with oppositely disposed in-turned angular flanges between which plates may be moved by bolts as the same threadably engage the plates so as to move the angular flanges away from one another.

The expanding coupling exerts its expanding action through its entire peripheral area due to the action being applied to the flanges comprising the split portion thereof.

DESCRIPTION OF THE DRAWINGS

FIG. 1 is a perspective elevation of an expanding coupling embodying the present invention.

FIG. 2 is a cross-section through a tubular member showing the expanding coupling positioned therein prior to expansion thereof.

FIG. 3 is a view similar to FIG. 2 showing the expanding coupling in expanded relation.

DESCRIPTION OF THE PREFERRED EMBODIMENT

The invention comprising the expanding coupling for tubular members may be seen in FIGS. 1, 2 and 3 of the drawings.

In FIGS. 1, 2 and 3 of the drawings a split sleeve 18 may be seen having oppositely disposed in-turned angular flanges 19, portions of which are arranged in reverse angles 20. Bolts 21 are positioned through a first flanged plate 22 disposed on the flanges 19 and extend through and threadably engage openings in a second flanged plate 23 positioned on the oppositely angled portions 20 of the flanges 19, rotation of the bolts 21 will move the first and second flanged plates 22 and 23 toward one another and impart an extremely forceful expanding motion to the flanges 19 and hence the split sleeve 18 of the expanding coupling.

By referring to FIG. 2 of the drawings the device of the invention may be seen loosely installed partially within a tubular member 24 and in FIG. 3 of the drawings, the bolts 21 have been tightened and the flanged plate 22 and 23 moved toward one another. Access to the bolts 21 is obtained through openings 25.

It will thus be seen that a simple and practical internal expanding coupling for tubular members has been disclosed which results in a relatively large degree of expansion of the expanding portion thereof when used and comprises a device which may be economically formed, easily installed, and conveniently operated for its intended purpose.

Although but one embodiment of the present invention has been illustrated and described, it will be apparent to those skilled in the art that various other changes and modifications may be made therein without departing from the spirit of the invention.

I claim:
1. An internal expanding coupling for tubular members, said coupling consisting of a tubular sleeve member split longitudinally with the split edges in-turned to form oppositely disposed longitudinally extending angular flanges integral therewith, each of said angular flanges having an oppositely disposed second angular section and an intermediate connecting section which intermediate section is arranged in spaced parallel relation to the other of said flanges on said split sleeve member, a pair of plates positioned within said split sleeve member against said angular flanges in oppositely disposed relation and headed bolts engaged in openings in said plates and movable rela- tive to said angular flanges so as to move said plates toward one another and thereby move said flanges apart to expand said coupling.

2. The internal expanding coupling for a tubular member set forth in claim 1 and wherein said plates have longitudinally extending angular flanges on their opposite longitudinal edges.

References Cited

UNITED STATES PATENTS

| 1,050,473 | 1/1913 | Levan | 287—58 |
| 1,068,030 | 7/1913 | Whitmore | 287—58 |
| 1,435,414 | 11/1922 | Morton | 287—58 |
| 2,192,048 | 2/1940 | Mueller | 287—127 |
| 2,997,317 | 8/1961 | Scott | 285—397 |

FOREIGN PATENTS

| 28,050 | 1897 | Great Britain. |

DAVID J. WILLIAMOWSKY, Primary Examiner

W. L. SHEDD, Assistant Examiner

U.S. Cl. X.R.

285—370; 287—111, 114